Aug. 9, 1949.   W. W. GRIGORIEFF   2,478,626
ELECTRIC BUSHING AND GLASS THEREFOR
Filed Sept. 9, 1947
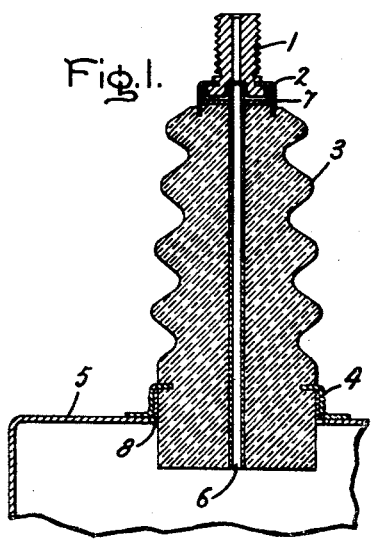
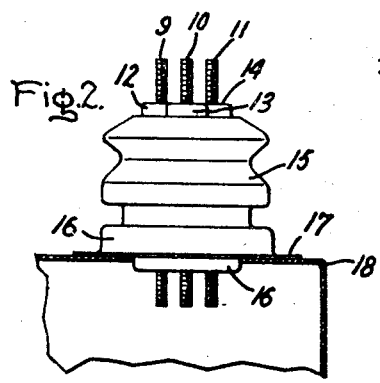
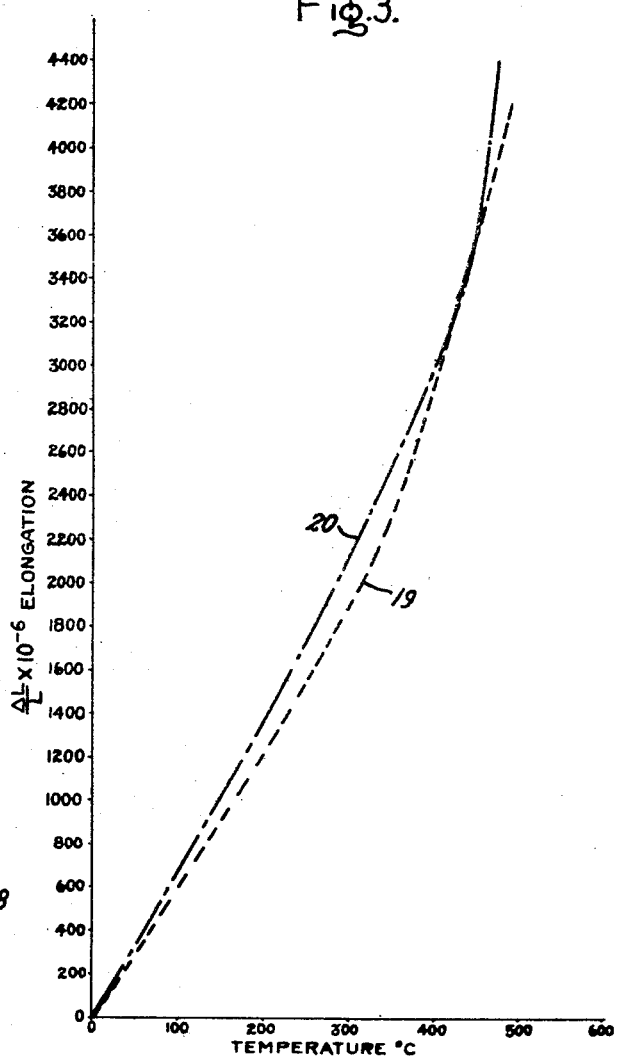
Inventor:
Wladimir W. Grigorieff.
by Harry E. Dunlap
His Attorney.

UNITED STATES PATENT OFFICE 2,478,626

ELECTRIC BUSHING AND GLASS THEREFOR

Wladimir W. Grigorieff, Fayetteville, Ark., assignor to General Electric Company, a corporation of New York Application September 9, 1947, Serial No. 772,983

6 Claims. (Cl. 174—152)

This application is a continuation-in-part of my prior application, Serial No. 710,031, filed November 15, 1946, now abandoned.

The present invention relates to cast glass electric devices, such as insulating bushings, and includes lead-free borosilicate glasses of novel characteristics which are particularly well adapted for sealing into unitary relation with parts consisting of nickel-iron alloy.

Glasses embodying my invention are characterized by a high degree of fluidity when molten and hence are suited for casting into molds in the fabrication of articles of complex configuration.

Heretofore cast-glass electric bushings have been fabricated by casting lead-containing glass into contact with metal parts. Such bushings are described, for example, in prior Patent 2,299,750 of Hull and Moore patented October 27, 1942. It has been found that metal parts consisting of ferrous alloy when in contact with the molten lead glass enter into a chemical reaction with the glass composition. This causes the deposition of metallic lead on the surface of the ferrous metal, and resulting in inadequate adhesion and faulty sealing between the metal and the glass. It has been proposed to protectively precoat the metal parts to prevent lead deposition, but such operations are complicated, costly and time-consuming. Glasses embodying my invention can be cast and sealed into direct contact with uncoated ferrous metals without such difficulty.

The lead glass described above has also poor weather-resisting properties. The surface of the glass becomes roughened when exposed to the atmosphere under varying conditions of humidity thereby promoting the collection thereon of dirt and carbon particles. Such deposits reduce the effective creepage resistance of a bushing resulting eventually in electric discharges over the surface of the bushing, with attendant short-circuits and damage to the bushing and other equipment. Glasses embodying my present invention are highly resistant to weathering. Their surfaces remain substantially unaltered even when subjected to prolonged contact with atmospheric or other chemically active agents.

Glasses embodying my invention may be considered as soft borosilicate glasses containing chemically combined a total amount of alkali oxide in the range of about 8 to 13 per cent.

Although some small changes of composition occur due to volatilization and other natural causes, the composition of the glass batch (starting materials) determines the composition of the resulting glass. The batch ingredients from which the glasses of this invention are prepared combine to form glasses of the following approximate range of proportions indicated:

| Ingredients | Range |
|---|---|
| | Per cent |
| Silica—$SiO_2$ | 60 to 69 |
| Boric oxide—$B_2O_3$ | 20 to 25 |
| Alumina—$Al_2O_3$ | 3 to 8 |
| Sodium oxide—$Na_2O$ | 3.4 to 6 |
| Potassium oxide—$K_2O$ | 1 to 5 |
| Lithium oxide—$Li_2O$ | 2.5 to 5.5 |

Sometimes ingredients containing (or consisting of) additional oxides may be added in small amounts, for example, for coloring purposes, as will be hereinafter illustrated.

The accompanying drawing shows, somewhat conventionally, insulating bushings which embody the novel glass composition of my invention. Fig. 1 is a longitudinal section of a single-conductor bushing; Fig. 2 is a side elevation of a multiconductor type of bushing; and Fig. 3 is a graph showing coefficients of elongation of glass and metal parts of such bushings.

The bushing shown in Fig. 1 includes a screw-threaded hollow terminal stud 1 which is brazed to a collar 2, the latter in turn being embedded in a glass insulator 3. This insulator, which embodies the present invention, is cast from fusion to envelop the rim of this upper collar 2 and also the rim of a lower collar 4 which serves as mounting flange whereby the bushing is joined to a container 5 (shown broken away) by soldering, brazing, or welding, thus providing hermetic seals between all metal-to-glass and metal-to-metal joints. A metal tube 6 which is positioned within a metal thimble 7 passes longitudinally through the glass insulators 3. A metal conductor (not shown) leading to the interior terminal of an electric device may be passed through the tube 6. It may be attached to the terminal stud 1 in any suitable way as by soldering or brazing. The metal thimble 7 at the upper end of the bushing and the shield 8 within the collar 4 shields portions of the adjoining collars from contact with fused glass during casting thus permitting expansion and contraction of the bushing parts without damage.

In Fig. 2 is shown a modified bushing which comprises three terminal studs 9, 10 and 11 which are respectively provided with collars 12, 13 and 14. The rims of these collars are similarly embedded in a cast glass insulator 15 which embodies the present invention. An inwardly projecting flange of the basal collar 16 is embedded in the glass insulator 15 while the latter is cast in the fused state. The flange 17 of the collar 16 is joined by welding or otherwise to a container 18 of a capacitor, transformer or other electric device.

The following compositions are illustrative of my invention. The ingredients need not necessarily consist of the indicated oxides in an uncombined state. For example, carbonates of the alkali metals ordinarily are used, the carbonate breaking down thermally to yield the indicated amounts of oxide. The proportions given are for equivalent oxide content. In the third example, color-producing oxides are added:

| Ingredients | Proportions in Per Cent by Weight | | |
|---|---|---|---|
| | Glass No. 1 | Glass No. 2 | Glass No. 3 |
| $SiO_2$ | 64.0 | 63.5 | 62.8 |
| $B_2O_3$ | 20.6 | 21.8 | 21.4 |
| $Al_2O_3$ | 3.4 | 3.5 | 3.4 |
| $K_2O$ | 2.5 | 2.4 | 2.3 |
| $Na_2O$ | 5.1 | 5.4 | 5.3 |
| $Li_2O$ | 4.4 | 3.4 | 3.4 |
| $Fe_2O_3$ | | | 0.8 |
| $MnO_2$ | | | 0.6 |

Fusion and reaction of the batch ingredients occurs in a suitable glass-making furnace, preferably an electric furnace. The resulting fused glass is cast at a temperature of about 1250° C. into suitable molds provided with desired metallic inserts. Glass compositions embodying my invention have densities in the range of about 2.36 to 2.38. Metal bodies may be caused to be embedded in and to adhere without undesired chemical effects to cast glass so as to form an integral part of the finished article. These inserts preferably consist of a metal having a coefficient of linear expansion of nickel-iron alloy consisting of 57–59% iron and 43–41% nickel. An alloy of this composition has a coefficient of linear expansion of about $5.5 \times 10^{-6}$ in the temperature range of 25 to 300° C.

As the glasses of my invention have closely similar coefficients of expansion as iron-nickel alloy, a firm union is maintained between the glass and metal.

The following analyses were made of glasses embodying my invention: These analyses are to be considered as illustrative and not as limiting my invention.

| Ingredients | Proportions in Per Cent by Weight | | |
|---|---|---|---|
| | Glass A | Glass B | Glass C |
| $SiO_2$ | 68.0 | 67.5 | 68.0 |
| $B_2O_3$ | 16.0 | 17.1 | 17.9 |
| $Al_2O_3$ | 7.1 | 6.9 | 6.6 |
| $K_2O$ | 1.6 | 1.5 | 1.8 |
| $Na_2O$ | 3.4 | 3.6 | 3.1 |
| $Li_2O$ | 3.9 | 3.4 | 2.6 |

Graph 19, Fig. 3 shows the rate of linear change $$\frac{\Delta L}{L} \times 10^{-6}$$

over an indicated temperature range of an alloy consisting by weight of about 58% iron and 42% nickel. Graph 20 shows similarly the coefficient of linear change $$\frac{\Delta L}{L} \times 10^{-6}$$

of a glass embodying my invention. These two graphs show that there are some differences in the expansion and contraction characteristics of the metal alloy and the glass, the differences are not great enough to cause cracking or other difficulty in the manufacture of composite metal and glass articles, such for example, as the bushings shown in the drawing.

The mixed alkali oxides, and particularly the lithium oxide, impart to the glass a desired low viscosity at a temperature at which the glass may be cast through a restricted orifice into a mold in contact with metal members for example, when casting glass for insulating bushings such as shown in the accompanying drawing. Such molds may have a maximum pouring opening of ⅜″ to ½″ diameter and hence require a highly fluid melt to be cast through such restricted orifices.

The presence of the three alkalies imparts to the glass better weather-resisting qualities than would result if a single alkali were present.

Some of the useful properties of borosilicate glass embodying my invention have been described in connection with electric bushings in which such glass constitutes the insulating member. However, glass of my invention is not limited in its useful applications to electric bushings.

What I claim as new and desire to secure by Letters Patent of the United States is:

1. A glass composition having sufficient fluidity when heated to about 1250 to 1300° C. to flow when cast through a restricted orifice of about ⅜ inch diameter and to hermetically seal to metal member consisting of about 41 to 43 per cent nickel and 59 to 57 per cent iron, such glass having the following approximate range of composition:

| | Per cent |
|---|---|
| Silica | 60 to 69 |
| Boric oxide | 20 to 25 |
| Alumina | 3 to 8 |
| Lithium oxide | 2.5 to 5.5 |
| Sodium oxide | 3.4 to 6 |
| Potassium oxide | 1 to 5 |

2. A glass suitable for casting in molds comprising the following oxides as essential ingredients:

| | Per cent |
|---|---|
| Silica | 64.0 |
| Boric oxide | 20.6 |
| Alumina | 3.4 |
| Potassium oxide | 2.5 |
| Sodium oxide | 5.1 |
| Lithium oxide | 4.4 |

3. A glass suitable for casting in molds comprising the following oxides as essential ingredients:

| | Per cent |
|---|---|
| Silica | 62.8 |
| Boric oxide | 21.4 |
| Alumina | 3.4 |
| Potassium oxide | 2.3 |
| Sodium oxide | 5.3 |
| Lithium oxide | 3.4 |
| Iron oxide ($Fe_2O_3$) | 0.8 |
| Manganese dioxide ($MnO_2$) | 0.6 |

4. A bushing for an electric device comprising an insulating member of glass containing the following constituents combined within the indicated range of proportions: silica 60 to 69 per cent, boric oxide 20 to 25 per cent, alumina 3 to 8 per cent, lithium oxide 2.5 to 5.5 per cent, sodium oxide 3.8 to 6 per cent and potassium oxide 1 to 5 per cent and cooperating electric terminal members consisting of an alloy of 41 to 43 per cent nickel and 59 to 57 per cent iron embedded in part in said glass member.

5. A bushing for an electric device comprising an insulating member of glass containing the following constituents combined with the indicated range of proportions:

| | Per cent |
|---|---|
| Silica | 64.0 |
| Boric oxide | 20.6 |
| Alumina | 3.4 |
| Potassium oxide | 2.5 |
| Sodium oxide | 5.1 |
| Lithium oxide | 4.4 | and cooperating electric terminal members consisting of an alloy of 42 per cent nickel and 58 per cent iron embedded in part in said glass member.

6. A glass suitable for casting in molds and having a coefficient of expansion approximating that of an alloy of 41 to 43 per cent nickel and 59 to 57 per cent iron, said glass consisting of 63.5 per cent silica, 21.8 per cent boric oxide, 3.5 per cent alumina, 2.4 per cent potassium oxide, 5.4 per cent sodium oxide and 3.4 per cent lithium oxide.

WLADIMIR W. GRIGORIEFF.

REFERENCES CITED

The following references are of record in the file of this patent:

UNITED STATES PATENTS

| Number | Name | Date |
|---|---|---|
| 1,394,296 | Fisher | Oct. 18, 1921 |
| 2,299,750 | Hull | Oct. 27, 1942 |
| 2,392,314 | Dalton | Jan. 8, 1946 |

OTHER REFERENCES

Ceramic Industry, January 1944. Pages 74 and 85.